(12) United States Patent
Choi

(10) Patent No.: US 9,056,728 B2
(45) Date of Patent: Jun. 16, 2015

(54) CHASSIS ASSEMBLY SYSTEM OF AUTOMOTIVE ASSEMBLING LINE

(71) Applicant: Hyundai Motor Company, Seoul (KR)

(72) Inventor: Young Hak Choi, Ulsan (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 13/727,028

(22) Filed: Dec. 26, 2012

(65) Prior Publication Data

US 2014/0119874 A1    May 1, 2014

(30) Foreign Application Priority Data

Oct. 30, 2012 (KR) .................. 10-2012-0121390

(51) Int. Cl.

| | |
|---|---|
| B62D 65/18 | (2006.01) |
| B65G 49/00 | (2006.01) |
| B65G 41/00 | (2006.01) |
| B66F 3/46 | (2006.01) |
| B66F 7/12 | (2006.01) |
| B66F 7/14 | (2006.01) |
| B65D 65/18 | (2006.01) |

(52) U.S. Cl.
CPC .............. *B65G 49/00* (2013.01); *B65G 41/003* (2013.01); *B66F 3/46* (2013.01); *B66F 7/12* (2013.01); *B66F 7/14* (2013.01); *B65D 65/18* (2013.01)

(58) Field of Classification Search
CPC ................ B66F 3/02; B66F 3/06; B66F 3/46; B66F 7/12; B66F 7/14; B62D 65/18; B65G 41/003
USPC .................................................. 414/589, 785
See application file for complete search history.

(56) References Cited

U.S. PATENT DOCUMENTS

| 5,588,506 A | * | 12/1996 | Born .............................. 187/209 |
| 2003/0002967 A1 | * | 1/2003 | Griffin ........................... 414/495 |
| 2010/0129187 A1 | * | 5/2010 | Nishihara ...................... 414/609 |

FOREIGN PATENT DOCUMENTS

| JP | 62-205871 A | 9/1987 |
| JP | 2005-238899 A | 9/2005 |

* cited by examiner

*Primary Examiner* — Gerald McClain
(74) *Attorney, Agent, or Firm* — Mintz Levin Cohn Ferris Glovsky and Popeo, P.C.; Peter F. Corless

(57) ABSTRACT

Disclosed herein is a chassis assembly device of a vehicle assembly line used to assemble a plurality of components on a vehicle body in an assembly process including a main lift disposed on a carriage and configured to move along a carriage line, support a vehicle body, and lift upward or downward; and a sub lift unit disposed on the carriage to lift the plurality of components to an assembly position of the vehicle body.

1 Claim, 5 Drawing Sheets

CHASSIS ASSEMBLY SYSTEM OF AUTOMOTIVE ASSEMBLING LINE

CROSS-REFERENCE TO RELATED APPLICATION

This application claims priority to and the benefit of Korean Patent Application No. 10-2012-0121390 filed in the Korean Intellectual Property Office on Oct. 30, 2012, the entire contents of which are incorporated herein by reference.

BACKGROUND OF THE INVENTION (a) Field of the Invention

An exemplary embodiment of the present invention relates to a vehicle assembly system. More particularly, the present invention relates to a chassis assembly device that assembles components such as a chassis module on a vehicle body in a fitting process in a vehicle assembly line.

(b) Description of the Related Art

Generally, many components are assembled to manufacture a vehicle through several assembly steps by a vehicle manufacturer. The vehicle body and related components are moved on a transferring device in the manufacturing process of a vehicle which is automated to effectively manage the manufacturing process. Particularly, an engine, a transmission, and a chassis module are assembled on a vehicle body in a fitting process of a manufacturing process of a vehicle.

The supply components are assembled on the vehicle body that is transferred from a main hanger in the fitting process. For example, a chassis module (e.g., front chassis module, a rear chassis module, and so on) is assembled on a vehicle body in the fitting process. The system may be known as a chassis assembly system.

The chassis assembly system, as shown in FIG. 1, includes a chassis hanger 3 that transfers a vehicle body 1, a carriage 7 (e.g., a chassis assembly carriage) that transfers a chassis module 5, and a chassis module lift 8 disposed on the carriage 7 to transfer the chassis module 5 to the vehicle body 1.

Furthermore, the chassis hanger 3 and the carriage 7 are synchronized to mount the chassis module 5 on the vehicle body 1. In other words, the vehicle body 1 and the chassis module 5 are controlled to move at the same speed in the synchronization area and the mounting area in the chassis assembly system.

Accordingly, it is important to synchronize the hanger 3 and the carriage in a conventional art, and the assembly process can be stopped by an abnormal synchronization. In addition, an upper structure such as a truss 9 is necessary for mounting the chassis hanger 3 in a conventional art. Thus, in the conventional art, overall line structure becomes complex, investment cost is increased, and a vehicle body can be separated and fall from the chassis hanger 3.

The above information disclosed in this section is only for enhancement of understanding of the background of the invention and therefore it may contain information that does not form the prior art that is already known in this country to a person of ordinary skill in the art.

SUMMARY

The present invention provides a chassis assembly system of a vehicle assembly line having advantages of preventing assembly halt caused by an abnormal synchronization of a chassis hanger and a carriage, eliminating an upper structure for mounting a chassis hanger, and preventing the separation and fall of a vehicle body.

A chassis assembly device used to assemble components on a vehicle body in an assembly process according to an exemplary embodiment of the present invention may include: a main lift disposed on a carriage and is configured to move along a carriage line, support a vehicle body, and lift upward or downward; and a sub lift disposed on the carriage configured to lift components to an assembly position of the vehicle body.

The main lift may include a pair of lift bodies integrally combined with the carriage; a pair of lift rods disposed on the lift body, configured to support the vehicle body, and move upward or downward; and a power delivery portion disposed on the lift body and configured to transform the rotation torque of the servo motor to a rectilinear motion of the lift rod.

The power delivery portion may include a differential portion connected to the servo motor, and a power transformation portion connected to the differential portion and configured to transform the rotation movement of the differential portion to a rectilinear motion to move the lift rod upward or downward.

The power transformation portion may be mounted on the lift body and the differential portion may be connected to the power transformation portion between the lift bodies. The sub lift may be respectively disposed at both sides between the main lift.

The chassis assembly device may further include a transfer portion configured to transfer the components to the sub lift. The main lift and the sub lift may be integrally formed with the carriage.

In exemplary embodiments of the present invention, a main lift for lifting a vehicle body and a sub lift for lifting a chassis module may be integrally formed to improve the line operating ratio.

In addition, in exemplary embodiments of the present invention, the upper structure for mounting a chassis hanger is eliminated and thus, the cost of manufacturing the device may decrease, optimum working phenomenon may increase, the vehicle may not separated from the hanger, and the safety of the vehicle attachment to the device may be guaranteed.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings.

Figure 1:
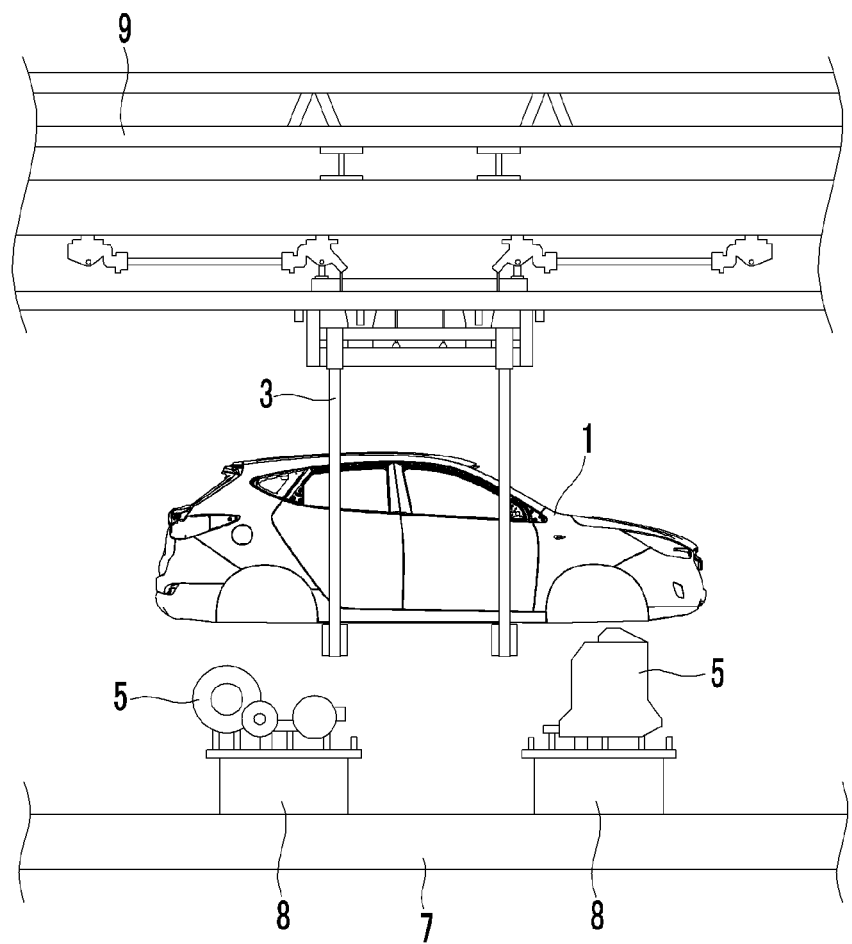
FIG. 1 is an exemplary schematic illustrating a chassis assembly device of a vehicle assembly line according to a conventional art.

| <Description of symbols> | | | |
|---|---|---|---|
| 1 | vehicle body | 5 | chassis module |
| 10 | carriage | 30 | main lift |
| 31 | lift body | 33 | lift rod |
| 41 | power delivery portion | 43 | servo motor |
| 45 | differential portion | 47 | power transformation portion |
| 50 | sub lift | 70 | transfer portion |
| 71 | transfer rail | | |

DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. To clarify the present invention, parts that are not connected with the description will be omitted, and the same elements or equivalents are referred to by the same reference numerals throughout the specification. Additionally, the size and thickness of each element are arbitrarily shown in the drawings and the present invention is not necessarily limited thereto, and in the drawings, the thickness of layers, films, panels, regions, etc., are exaggerated for clarity. In the following detailed description, to distinguish constituent elements of the same name, the constituent elements have names of a first, a second, and a third, and the first, the second, and the third are not limited to order thereof.

Figure 2:
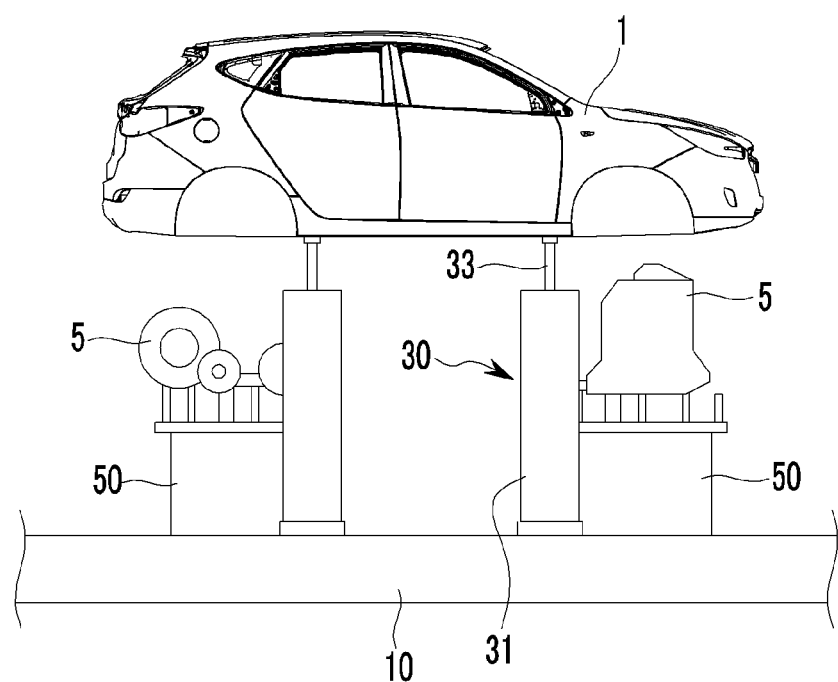
FIG. 2 is an exemplary schematic illustrating a chassis assembly device of a vehicle assembly line according to an exemplary embodiment of the present invention.
Figure 3:
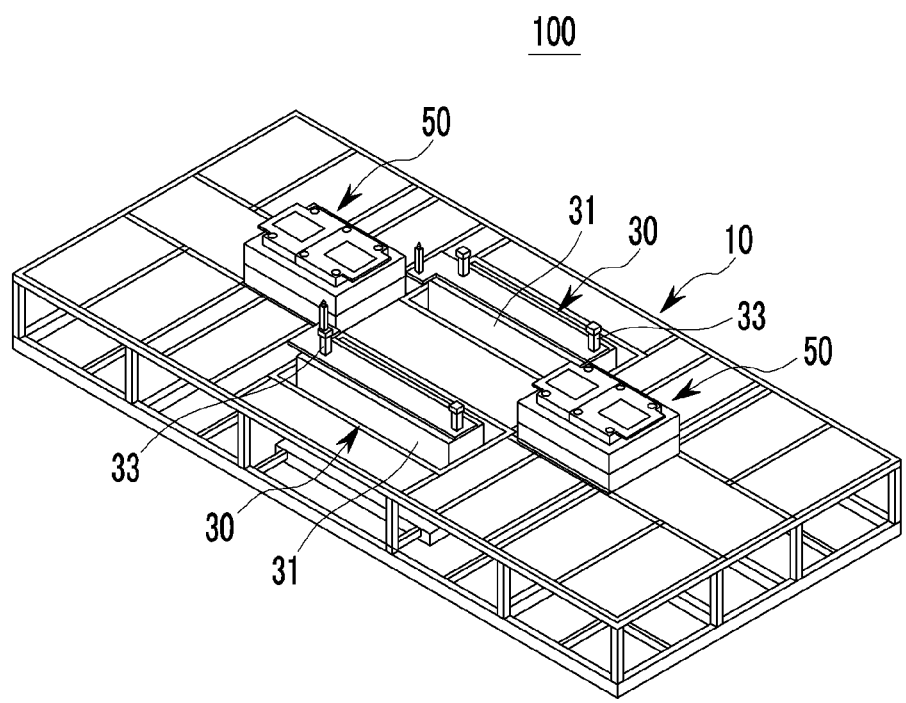
FIG. 3 is an exemplary view showing a chassis assembly device of a vehicle assembly line according to an exemplary embodiment of the present invention.
Figure 4:
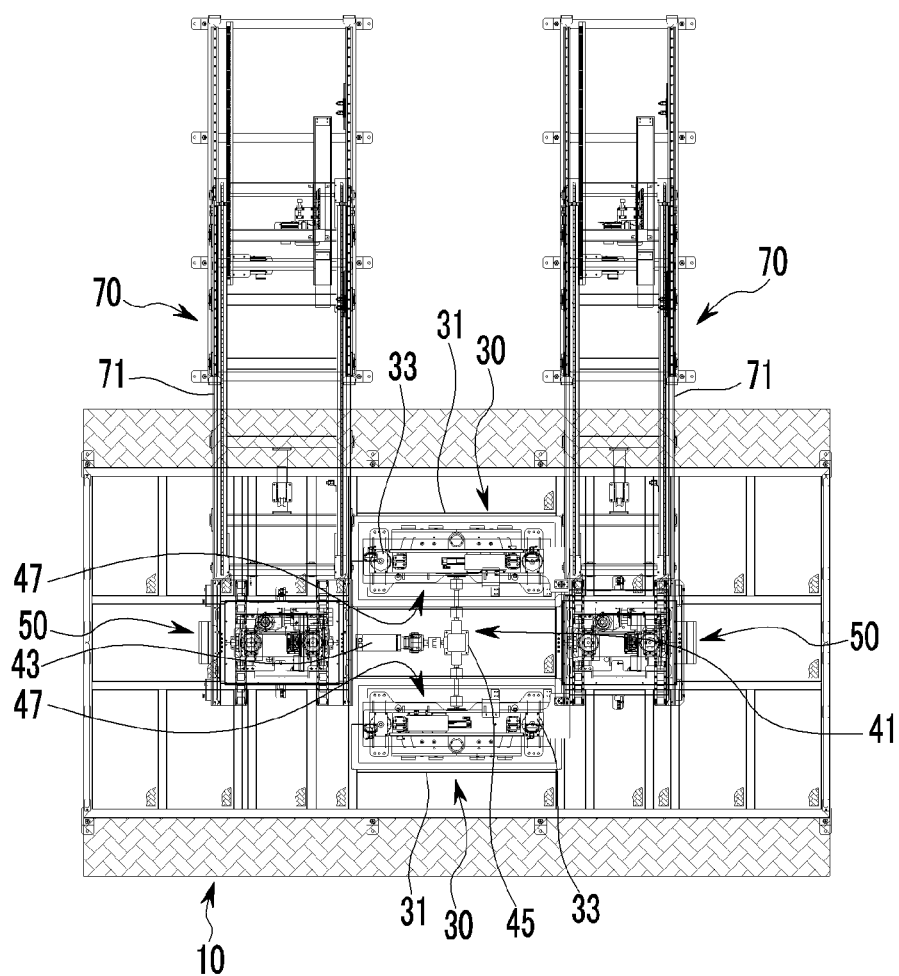
FIG. 4 is an exemplary schematic diagram showing a chassis assembly device of a vehicle assembly line according to an exemplary embodiment of the present invention.

FIG. 2 shows an exemplary schematic of a chassis assembly device of a vehicle assembly line according to an exemplary embodiment of the present invention, FIG. 3 is an exemplary view showing a chassis assembly device of a vehicle assembly line according to an exemplary embodiment of the present invention, and FIG. 4 is an exemplary schematic diagram showing a chassis assembly device of a vehicle assembly line according to an exemplary embodiment of the present invention.

Referring to FIG. 2 to FIG. 4, a chassis assembly device 100 of a vehicle assembly line according to an exemplary embodiment of the present invention may be applied to a fitting process configured to mount an engine, a transmission, a chassis module, etc. on a vehicle body 1. For example, the chassis assembly device 100 may be applied to a chassis assembly process configured to mount a chassis module 5 of front and rear sides on a vehicle body 1.

The chassis assembly device 100 of a vehicle assembly line may prevent the assembly to halt due to an abnormal synchronization of the chassis hanger and the carriage. In addition, the chassis assembly device 100 of the vehicle assembly line may eliminate an upper structure for mounting a chassis hanger, and may increase the device the safety by preventing the separation and fall of the vehicle body. Specifically, the chassis assembly device 100 of the vehicle assembly line may include a main lift 30 and a sub lift unit 50 disposed on a carriage 10 configured to move along a carriage line.

Figure 5:
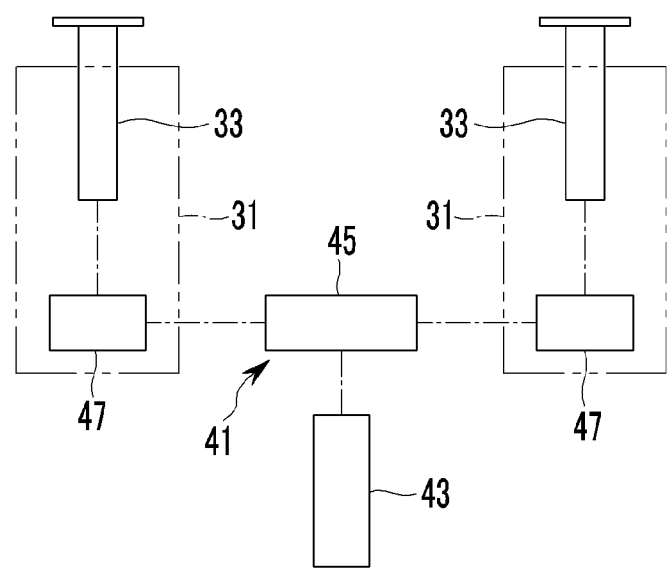
FIG. 5 is an exemplary block diagram schematically showing a main lift applied to a chassis assembly device of a vehicle assembly line according to an exemplary embodiment of the present invention.

FIG. 5 is an exemplary block diagram schematically showing a main lift applied to a chassis assembly device of a vehicle assembly line according to an exemplary embodiment of the present invention. Referring to FIG. 5, the main lift 30 may support the vehicle body 1 and move the vehicle body 1 upward or downward. The main lift 30 may be integrally formed with the carriage 10. Furthermore, the main lift 30 may include a lift body unit 31, a lift rod unit 33, and a power delivery portion 41.

The lift body unit 31 may include a plurality of lift bodies disposed toward each other, and may be integrally combined with the carriage 10. Similarly, the lift rod unit 33 may include a plurality of lift rods on each lift body 31, and may be configured to support the vehicle body 1, and move the vehicle body 1 upward or downward.

The power delivery portion 41 may be used to transform the rotation torque of the servo motor 43 to a rectilinear motion of the lift rod 33. The power delivery portion 41 may be substantially connected to the lift body 31. Additionally, the power delivery portion 41 may include a differential portion 45 connected to a servo motor 43, and a power transformation portion 47 connected to the differential portion 45 to transform the rotation movement of the differential portion 45 to the rectilinear motion of the lift rod 33.

The differential portion 45 may be connected to the drive shaft of the servo motor 43 and may be connected to the power transformation portion 47 of the lift body 31 between the lift bodies 31. The differential portion 45 has been widely known to a person skilled in this art, and thus the detailed description thereof will be omitted in this specification.

The power transformation portion 47 may be disposed at each lift body 31 and may be connected to the differential portion 45. Furthermore, the power transformation portion 47 may include a conventional power transformation device, having a gear, a chain, and a rack device.

In an exemplary embodiment of the present invention, the rotation of the servo motor 43 may be transformed to a rectilinear motion through the power delivery portion 41 to move the lift rod 33 upward or downward, but the present invention is not limited thereto, the lift rod may be moved upward or downward by hydraulic pressure or air pressure.

Moreover, as shown in FIG. 2 to FIG. 4, the sub lift unit 50 may be integrally formed with the carriage 10 with the main lift 30. The sub lift unit 50 may support the chassis module 5 of the front and the rear side and lift the chassis module 5 to an assembly position of the vehicle body 1. Furthermore, the sub lift unit 50 may include a plurality of sub lifts 50.

Each sub lift 50 may be respectively disposed at both exterior sides of the lift bodies 31 of the main lift 30. The sub lift unit 50 may transform the rotation movement of the motor to a rectilinear motion similar to the main lift 30 and may lift the chassis module 5 upward or downward. Alternatively, the sub lift unit 50 may lift the chassis module 5 by hydraulic pressure or air pressure.

On the other hand, the chassis assembly device 100 according to an exemplary embodiment of the present invention may further include a transfer device 70 configured to transfer the chassis module 5 to the sub lift unit 50. The transfer device 70 may use an operating portion such as a motor or an operating cylinder to transfer the chassis module 5 to the sub lift unit 50 on the carriage 10. The transfer portion 70 may include a transfer rail 71 to transfer the chassis module 5 to the sub lift unit 50.

As described above, the chassis assembly device 100 of a vehicle assembly line according to an exemplary embodiment of the present invention may integrally form the main lift 30 configured to lift the vehicle body 1 on the carriage 10 with the sub lift unit 50 configured to lift the chassis module 5. Accordingly, in an exemplary embodiment of the present invention, the assembly may not stop due to an abnormal synchronization to improve the line operating ratio. In addition, the upper structure for mounting a chassis hanger may be eliminated to reduce the manufacturing cost of the device, optimal working operation may be realized, and the safety of the vehicle attachment to the device may be guaranteed by preventing the separation and the fall of the vehicle.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A chassis assembly device used to assemble a plurality of components on a vehicle body in an assembly process, comprising:

a main lift disposed on a carriage is configured to move along a carriage line, support the vehicle body, and lift upward or downward, the main lift further comprising:

a plurality of lift bodies integrally combined with the carriage;

a plurality of lift rods disposed on each lift body, configured to support the vehicle body, and move upward or downward; and a power delivery portion disposed on the lift body and configured to transform the rotation torque of a servo motor to a rectilinear motion of each lift rod, wherein the power delivery portion includes:

a differential portion connected to the servo motor; and a power transformation portion connected to the differential portion and configured to transform a rotation movement of the differential portion to the rectilinear motion to move each lift rod upward or downward, wherein the power transformation portion is mounted on each lift body and the differential portion is connected to the power transformation portion between each lift body;

a sub lift unit spaced apart from the main lift by a predetermined distance on the carriage and configured to lift the plurality of components to an assembly position of the vehicle body; and a transfer device including at least a motor or an operating cylinder and a transfer rail to transfer the plurality of components to the sub lift unit, wherein the main lift and the sub lift unit are integrally formed with the carriage, each sub lift unit is respectively disposed at both exterior sides of the main lift, the plurality of components includes at least one chassis module, and wherein the at least one chassis module that is disposed on the sub lift unit translates distinctly from the vehicle body that is disposed on the main lift.

\* \* \* \* \*